United States Patent [19]
Otsuka et al.

[11] Patent Number: 6,109,510
[45] Date of Patent: *Aug. 29, 2000

[54] BRAZING MATERIAL FOR USE IN A LOW TEMPERATURE BRAZING AND METHOD FOR LOW TEMPERATURE BRAZING

[75] Inventors: Ryotatsu Otsuka, Osaka; Masakazu Furuta, Tochigi; Yuji Asano, Ohiramachi, all of Japan

[73] Assignee: Showa Aluminum Corporation, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/080,682

[22] Filed: May 18, 1998

[30] Foreign Application Priority Data

Jun. 13, 1997 [JP] Japan .................................. 9-156488

[51] Int. Cl.$^7$ ....................................... B23K 1/19

[52] U.S. Cl. .................................. 228/262.51; 228/262.9

[58] Field of Search ................................... 420/514, 540; 228/262.51, 262.9

[56] References Cited

U.S. PATENT DOCUMENTS

| | | | |
|---|---|---|---|
| 3,395,001 | 7/1968 | Stroup et al. | 29/197.5 |
| 3,733,687 | 5/1973 | Tanaka et al. | |
| 3,807,033 | 4/1974 | Schoer et al. | 29/494 |
| 4,448,748 | 5/1984 | Radtke et al. | 420/514 |
| 4,609,529 | 9/1986 | Skenazi et al. | 420/516 |
| 4,655,385 | 4/1987 | Suzuki et al. | 228/223 |
| 4,717,430 | 1/1988 | Beal | 148/24 |
| 4,722,871 | 2/1988 | Radtke | 428/653 |
| 4,789,522 | 12/1988 | Smith et al. | 420/514 |
| 4,812,371 | 3/1989 | Shindou et al. | 428/659 |
| 4,861,681 | 8/1989 | Asano et al. | 428/654 |
| 4,929,511 | 5/1990 | Bye, Jr. et al. | 428/606 |
| 4,952,368 | 8/1990 | Skenazi et al. | 420/513 |
| 5,425,913 | 6/1995 | Strauven et al. | 420/514 |

FOREIGN PATENT DOCUMENTS 0 668 364 A1  8/1995  European Pat. Off. .
WO 81/02748  10/1981  WIPO .

OTHER PUBLICATIONS

No. 263571, Pu, Ruiting, "Low melting point rare earth metal– containing zinc–based soft solders for soldering of aluminum sheets and other metal sheets" & CN 1102797 Peop. Rep. China, May 24, 1995.

Patent Abstracts of Japan, vol. 018, No. 490 (C–1249), Sep. 13, 1994 & JP 06 158258 A (Nippon Steel Corp.), Jun. 7, 1994.

Chemical Abstracts, vol. 89, No. 14, Oct. 2, 1978, Columbus, Ohio, US; Abstract No. 116592, Harakawa Y. et al. "Solders for ultrasound soldering" & JP 53 014640 A (Teikoku Piston Ring) Feb. 9, 1978.

Chemical Abstracts, vol. 119, No. 12, Sep. 20, 1993, Columbus, Ohio, US; Abstract No. 132009, Savitskij, Aleksej A. et al. "Zinc–containing braze for aluminum alloys" & SU 1 743 772 A (Altajskij Polt I IM.I.I.Polzunova, USSR).

*Primary Examiner*—Ngoclan Mai

[57] ABSTRACT

A brazing material that has a low melting point and can braze aluminum materials at a low temperature with a good wetting property is disclosed. The brazing material can include a matrix composed of Zn, a Zn—Al alloy or a Al—Zn—Si alloy having a low melting point each preferably containing 0.001 to 3.0 wt % of rare-earth element. When such a brazing material is used, aluminum materials can be brazed at a temperature of 580° C. or below.

6 Claims, 1 Drawing Sheet

BRAZING MATERIAL FOR USE IN A LOW TEMPERATURE BRAZING AND METHOD FOR LOW TEMPERATURE BRAZING

BACKGROUND OF THE INVENTION

1. Field of the Invention

This invention relates to a brazing material having a low melting point for use in a low temperature brazing, which is preferably used to braze aluminum materials having a low-melting point such as cast materials. The invention also relates to a method for low temperature brazing by using the brazing material.

2. Description of the Related Art

In brazing aluminum cast materials or die-cast materials which melt at 600° C. or below, a brazing material having a low melting point thereby enabling a low temperature brazing usually is required. Besides, with a view toward energy savings, a brazing material is required that can braze flattening materials which have various melting points, at a temperature lower than a brazing temperature of Al—Si brazing material.

In brazing different metallic materials such as an aluminum material and an iron material at a high temperature, a brittle intermetallic compound is produced, which deteriorates the strength of the brazed portion. Thus, in order to suppress the intermetallic compound, a brazing material that enables a low temperature brazing is desired.

Conventionally, as a brazing material which melts at a low temperature, brazing materials containing a large amount of Zn, such as a Zn-base alloy, a Zn—Al alloy or a Zn—Si—Al alloy, have been used.

The above-mentioned brazing materials containing a large amount of Zn has advantages that they enable a low temperature brazing because the melting point is lower than that of an Al—Si alloy. However, the large amount of Zn causes a lack of wetting property of the brazing material on a base material, which results in a brazing defect at the brazed portion, thereby causing leakage.

SUMMARY OF THE INVENTION

An object of the present invention is to provide brazing material for use in a low temperature brazing which enables aluminum materials to be brazed at a low temperature and has a good wetting property.

An additional object of the present invention is to provide a method for brazing at a low temperature.

In accordance with these objectives, there is provided a brazing material for use in a low temperature brazing according to the present invention that includes Zn, Zn—Al alloy or Al—Zn—Si alloy as a matrix. The melting point is regulated by the composition ratio of the matrix elements. The brazing material further includes 0.001 to 3.0 wt % of rare-earth element, or further includes 0.005 to 3.0 wt % of Ti(titanium).

In detail, according to one aspect of the present invention, a brazing material for use in a low temperature brazing includes 0.001 to 3.0 wt % of rare-earth element, and the balance is composed of Zn and impurities. The rare-earth element may preferably fall within the range of from 0.005 to 1.0 wt %.

The brazing material including 0.001 to 3.0 wt % of rare-earth element, and the balance composed of Zn and impurities, may further include 0.005 to 3.0 wt % of Ti. In this case, the rare-earth element may preferably fall within the range of from 0.005 to 1.0 wt %.

The brazing material including 0.001 to 3.0 wt % of rare-earth element and the balance composed of Zn and impurities, may further include 30 wt % or less of Al. In this case, the rare-earth element may preferably fall within the range of from 0.005 to 1.0 wt %.

The brazing material including 0.001 to 3.0 wt % of rare-earth element and the balance composed of Zn and impurities, may further include 30 wt % or less of Al and 0.005 to 3.0 wt % of Ti. In this case, the rare-earth element may preferably fall within the range of from 0.005 to 1.0 wt %.

According to another aspect of the present invention, there is provided a brazing material for use in a low temperature brazing that includes 0.001 to 3.0 wt % of a rare-earth element, 20 to 50 wt % of Zn, 10 wt % or less of Si, and the balance composed of Al and impurities. The rare-earth element may preferably fall within the range of from 0.005 to 1.0 wt %.

The brazing material including 0.001 to 3.0 wt % of rare-earth element, 20 to 50 wt % of Zn, 10 wt % or less of Si, and the balance composed of Al and impurities, may further include 0.005 to 3.0 wt % of Ti. In this case, the rare-earth element may preferably fall within the range of from 0.005 to 1.0 wt %.

In accordance with an additional object of the invention, there is provided a method for low temperature brazing which includes a step of brazing aluminum materials by using the above-mentioned brazing materials for use in a low temperature brazing. When the brazing material including Zn as a matrix is used, the brazing can be conducted at a temperature of from 425 to 440° C. When the brazing material including Zn—Al alloy as a matrix is used, the brazing can be conducted at a temperature of from 390 to 540° C. When the brazing material including Al—Zn—Si alloy as a matrix is used, the brazing can be conducted at a temperature of from 520 to 580° C.

In detail, according to one aspect of the present invention, a method for low temperature brazing includes the step of brazing aluminum materials by using a brazing material at a temperature of from 425 to 440° C., wherein the brazing material includes 0.001 to 3.0 wt % of rare-earth element and the balance composed of Zn and impurities. The brazing material may further include 0.005 to 3.0 wt % of Ti.

According to another aspect of the present invention, there is provided a method for low temperature brazing that includes the step of brazing aluminum materials by using a brazing material at a temperature of from 390 to 540° C., wherein the brazing material includes 0.001 to 3.0 wt % of rare-earth element, 30 wt % or less of Al and the balance composed of Zn and impurities. The brazing material may further comprise 0.005 to 3.0 wt % of Ti.

According to still another aspect of the present invention, there is provided a method for low temperature brazing that includes the step of brazing aluminum materials by using a brazing material at a temperature of from 520 to 580° C., wherein the brazing material includes 0.001 to 3.0 wt % of rare-earth element, 20 to 50 wt % of Zn, 10 wt % or less of Si and the balance composed of Al and impurities. The brazing material may further include 0.005 to 3.0 wt % of Ti.

DESCRIPTION OF PREFERRED EMBODIMENTS

Figure 1:
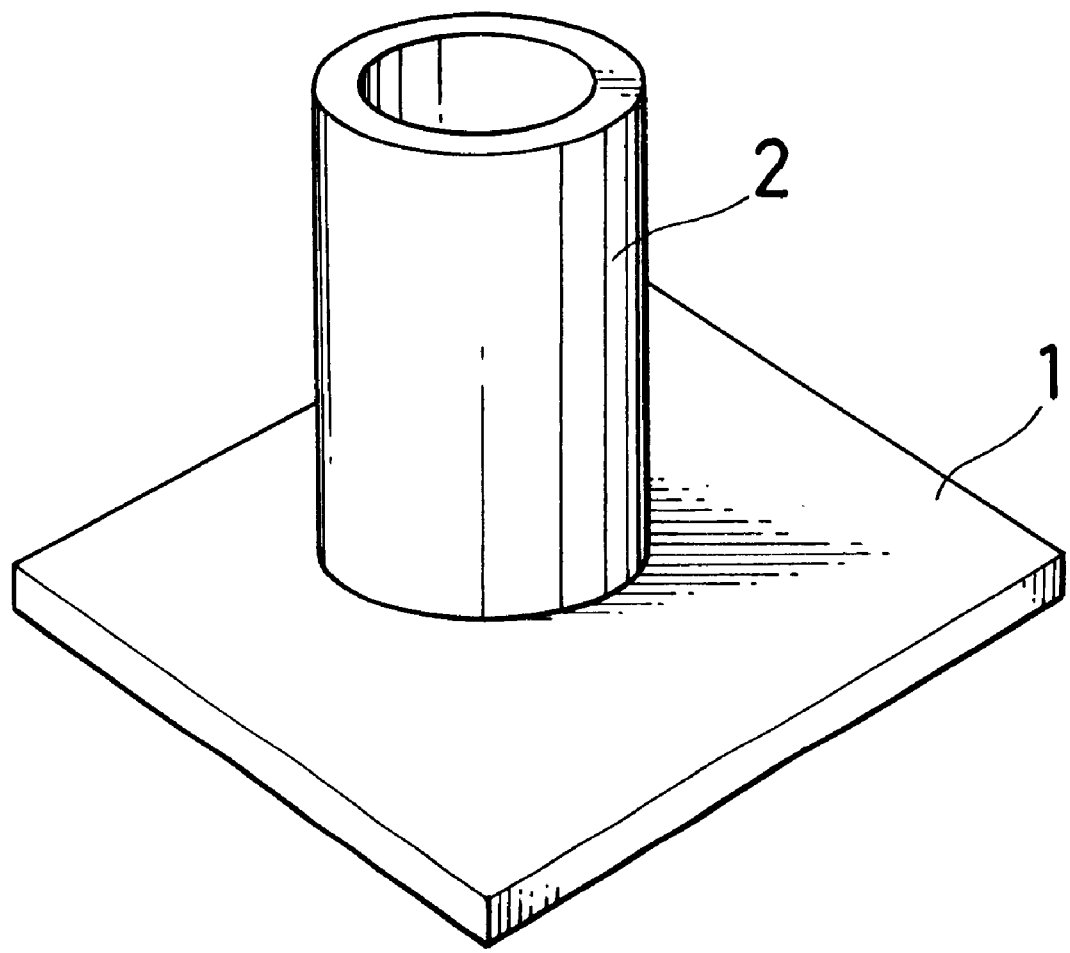
FIG. 1 is a perspective view showing brazing test pieces of an embodiment according to the present invention.

The terms "brazing materials" and "brazing" used herein denote an alloy for use in a low temperature jointing called "soldering materials" and a joining method called "soldering", respectively. Further, the term, "aluminum" used herein means aluminum and its alloys.

In the brazing material for use in a low temperature brazing according to the present invention, a common characteristic element is a rare-earth element. The rare-earth element is a general term including, for example, Sc(scandium), Y(yttrium), La(lanthanum), Ce(cerium), Pr(praseodymium), Nd(neodymium), Pm(promethium), Sm(samarium), Eu(europium), Gd(gadolinium), Td(terbium), Dy(dysprosium), Ho(holmium), Er(erbium), Tm(thulium), Yb(ytterbium) and Lu(lutetium). These elements are effective to improve the wetting property of the brazing material on aluminum materials. The rare-earth element may be used singly or jointly. A mixture of the rare-earth element such as misch metal may also be used. Among these elements, misch metal, La, Ce or Sm, which can be obtained at lower cost, is preferably used. The content of the rare-earth element should fall within the range of from 0.001 to 3.0% by weight(hereinafter referred to as "wt %"). If the content is less than 0.001 wt %, the effect of improving the wetting property becomes unsatisfactory, while if it exceeds 3.0 wt %, the workability of the brazing material deteriorates. The lower limit of the content of the rare-earth element is preferably 0.005 wt %, and more preferably more than 0.01 wt %. The upper limit is preferably 1.0 wt %.

Ti has an effect for preventing a solidification cracking of the brazed portion and, in addition, improves a brazeability of Zn—Al alloys. If the Ti content is less than 0.005 wt %, the above effect may become unsatisfactory, while if it exceeds 3.0 wt %, the workability of the brazing material deteriorates. Thus, the Ti content preferably is 0.005 to 3.0 wt %. The lower limit of the Ti content is preferably 0.01 wt % with the upper limit being preferably 2.0 wt %.

In one embodiment of the invention, the brazing material includes Zn and impurities as a matrix. The melting point of the brazing material is about 420° C. and its appropriate range of brazing temperature is 425 to 440° C. This brazing material further includes the rare-earth element with the content of the above-described range. This brazing material also may include the rare-earth element and Ti in an amount within the above-described ranges, respectively.

In another embodiment of the invention, the brazing material includes 30% or less of Al and the balance composed of Zn and impurities as a matrix. The melting point of the brazing material is regulated to be 380 to 520° C. by the Al content, i.e., the ratio of Al to Zn, and its appropriate brazing temperature is 390 to 540° C. The lower limit of the Al content is preferably 1.0 wt % with the upper limit being preferably 25 wt %. This brazing material preferably includes the rare-earth element with the content of the above-described range. This brazing material also may include the rare-earth element and Ti in an amount within the above-described ranges, respectively.

In yet another embodiment of the invention, the brazing material includes Al, Si and Zn as a matrix for regulating the melting point. Si improves fluidity of the brazing material and further lowers the melting point. This brazing material includes the rare-earth element with the content of the above-described range. This brazing material also may include the rare-earth element and Ti in an amount of within of the above-described ranges, respectively. The melting point of the brazing material is regulated to be 510 to 570° C. by the ratio of Al, Si and Zn, and its appropriate brazing temperature is 520 to 580° C. The lower limit of the Zn content is preferably 30 wt % with the upper limit being preferably 45 wt %. The lower limit of the Si content is preferably 3 wt % with the upper limit being preferably 8 wt %.

The method for low temperature brazing includes the step of brazing aluminum materials by using the brazing material including Zn and impurities as a matrix for use in a low temperature brazing described above. Since the melting point of the brazing material is about 420° C., the brazing preferably is conducted at a temperature of 425 to 440° C.

Another method for low temperature brazing includes the step of brazing aluminum materials by using the brazing material that includes Al, Zn, and impurities as a matrix for use in a low temperature brazing described above. Since the melting point of the brazing material is 380 to 520° C., the brazing preferably is conducted at a temperature of 390 to 540° C.

An additional method for low temperature brazing includes the step of brazing aluminum materials by using the brazing material that includes Al, Si, Zn and impurities as a matrix for use in a low temperature brazing described above. Since the melting point of the brazing material is 510 to 570° C., brazing preferably is conducted at a temperature of 520 to 580° C.

The brazing material for use in a low temperature brazing according to the present invention has a low melting point since it includes Zn, Zn—Al alloy or Al—Zn—Si alloy as a matrix. Since 0.001 to 3.0 wt % of the rare-earth element is added to the matrix, the wetting property on the base aluminum materials is good. When 0.005 to 3.0 wt % of Ti is also added to the brazing material, a solidification cracking can be diminished and the brazeability can be improved. Especially, the brazing material including 0.005 to 1.0 wt % of the rare-earth element has a remarkably improved wetting property The brazing materials for use in a low temperature brazing as described above enables a brazing at a temperature of 580° C. or below. The method for low temperature brazing according to the present invention, in which such brazing materials are used, is preferably applied to brazing low-melting aluminum materials such as cast materials and die-cast materials that should be brazed at a low temperature. However, the base material is not limited to the above. The brazing material and the brazing method also may be applied to brazing aluminum flattening materials having a higher melting point than the die-cast materials, and the like. In this case, it is advantageous that the brazing is conducted with less energy. Further, the brazing material and the brazing method are applicable when at least one of joining materials is an Al material, and the other thereof may be an aluminum material having the same composition, an aluminum material having a different composition, or a different metallic material such as iron other than aluminum.

As described above, the brazing material for use in a low temperature brazing according to the present invention includes Zn, Zn—Al alloy or Al—Zn—Si alloy as a matrix and ensures a low melting point depending on the composition ratio of the matrix elements. Further, the brazing material has an improved wetting property on the aluminum material due to the presence of 0.001 to 3.0 wt % of the rare-earth element. Therefore, the method for low temperature brazing by using such a brazing material can braze aluminum materials to obtain a well brazed portion with no leakage at a low brazing temperature of 580° C. or below. Especially, when the brazing material including 0.005 to 1.0 wt % of the rare-earth element is used, better brazed portion can be obtained by its remarkably improved wetting property.

When the brazing material includes 0.005 to 3.0 wt % of Ti in addition to the rare-earth element, a solidification cracking at the brazed portion is diminished and the quality of the brazed products is also improved.

Further, since a better brazing can be achieved at a low temperature as described above, when the brazing material according to the present invention is used for brazing an aluminum material and a metallic material other than an aluminum material, an amount of the produced intermetallic compound is diminished and thus high-quality brazed products can be produced.

Specifically preferred embodiments of the brazing material for use in a low temperature brazing and the method for low temperature brazing according to the present invention, will now be described.

EXAMPLES

Brazing materials of the inventive examples and the comparative examples each having a wire-like shape with a diameter of 2 mm and having compositions specified in Table 1 given below, were prepared. In Examples No. 7, 8, 18–22, each misch metal is a mixture of rare-earth elements including 25 wt % of La and 47 wt % of Ce as a main ingredient.

Three kinds of brazing tests were conducted on the prepared brazing materials depending on the melting point of the brazing materials as described below. Examples Nos. 1 to 7 and Comparative No. 1 were used in the following method (I), Examples Nos. 8 to 18 and Comparative No. 2 were used in the following method (II), and Examples No. 19 to 30 and Comparative No. 3 were used in the following method (III). In the brazing tests, an end surface of an aluminum pipe 2 made of JIS A6063 with an outer diameter of 30 mm and a thickness of 2 mm was brazed on an aluminum sheet 1 made of JIS ADC12 as shown in FIG. 1.

(I) Friction Brazing

The brazing material was heated by torch to melt. Jointing surfaces were preliminary plated by the molten brazing material while removing an oxide layer by sweeping the surface with a wire brush. Then, the plated jointing surfaces were rubbed with each other and joined under pressure and heat.

(II) Furnace Brazing

After removing an oxide layer on each jointing surface by sweeping with a wire brush, the jointing materials were furnace brazed in a nitrogen gas atmosphere using a mixture of chloride flux which melting point was regulated to be about 360° C. by the composition ratio of $BaCl_2$, NaCl, KCl, LiCl and $KAlF_4$. The heating temperature was set to be 420° C.

(III) Furnace Brazing

Brazing was conducted in the same manner as the brazing of (II) as described above except that the melting point of the mixture of chloride flux was regulated to be about 480° C. by its composition ratio and that the heating temperature was 550° C.

Ten pieces of brazing test products were made per each of the brazing materials, and the rate of leakage and solidification cracking were examined. On examining for leakage, the inside of the pipe 2 was made to have a nitrogen atmosphere with inner pressure of 196 kPa (2 $kgf/cm^2$) and immersed in water to visually inspect for leakage of nitrogen gas. Solidification cracking was examined by visual inspection of a leaked portion.

The results are summarized in Table 1.

TABLE 1

| | Composition of brazing material (wt %) | | | | | Brazing test | | |
|---|---|---|---|---|---|---|---|---|
| | rare-earth element | Ti | Si | Al | Zn | method | leakage | solidification cracking |
| Ex. 1 | La: 0.03 | — | — | — | Balance | I | Nil | Nil |
| Ex. 2 | La: 0.3 | — | — | — | Balance | | Nil | Nil |
| Ex. 3 | La: 0.03 | 0.1 | — | — | Balance | | Nil | Nil |
| Ex. 4 | La: 1.5 | 1.0 | — | — | Balance | | Nil | Nil |
| Ex. 5 | Sc: 0.3 | — | — | — | Balance | | Nil | Nil |
| Ex. 6 | Y: 0.3 | — | — | — | Balance | | Nil | Nil |
| Ex. 7 | Misch Metal: 0.3 | — | — | — | Balance | | Nil | Nil |
| Comp. 1 | — | — | — | — | Balance | | Yes | Nil |
| Ex. 8 | Ce: 0.05 | — | — | 5 | Balance | II | Nil | Nil |
| Ex. 9 | Ce: 1.0 | — | — | 10 | Balance | | Nil | Nil |
| Ex. 10 | Ce: 2.0 | — | — | 20 | Balance | | Nil | Nil |
| Ex. 11 | Ce: 1.0 | 1.0 | — | 10 | Balance | | Nil | Nil |
| Ex. 12 | Ce: 2.0 | 2.0 | — | 20 | Balance | | Nil | Nil |
| Ex. 13 | Pr: 1.0 | — | — | 10 | Balance | | Nil | Nil |
| Ex. 14 | Nd: 1.0 | — | — | 10 | Balance | | Nil | Nil |
| Ex. 15 | Pm: 1.0 | 1.0 | — | 10 | Balance | | Nil | Nil |
| Ex. 16 | Sm: 1.0 | — | — | 10 | Balance | | Nil | Nil |
| Ex. 17 | Eu: 1.0 | 1.0 | — | 10 | Balance | | Nil | Nil |
| Ex. 18 | Misch Metal: 1.0 | — | — | 10 | Balance | | Nil | Nil |
| Comp. 2 | — | — | — | 10 | Balance | | Yes | Yes |
| Ex. 19 | Misch Metal: 1.0 | — | 6 | Balance | 30 | III | Nil | Nil |
| Ex. 20 | Misch Metal: 2.0 | — | 6 | Balance | 40 | | Nil | Nil |
| Ex. 21 | Misch Metal: 1.0 | 1.0 | 6 | Balance | 30 | | Nil | Nil |
| Ex. 22 | Misch Metal: 2.0 | 2.0 | 6 | Balance | 40 | | Nil | Nil |
| Ex. 23 | Gd: 1.0 | — | 6 | Balance | 30 | | Nil | Nil |
| Ex. 24 | Tb: 1.0 | — | 6 | Balance | 30 | | Nil | Nil |
| Ex. 25 | Dy: 1.0 | 1.0 | 6 | Balance | 30 | | Nil | Nil |
| Ex. 26 | Ho: 1.0 | 1.0 | 6 | Balance | 30 | | Nil | Nil |
| Ex. 27 | Er: 1.0 | — | 6 | Balance | 30 | | Nil | Nil |
| Ex. 28 | Tm: 1.0 | — | 6 | Balance | 30 | | Nil | Nil |
| Ex. 29 | Yb: 1.0 | 1.0 | 6 | Balance | 30 | | Nil | Nil |
| Ex. 30 | Lu: 1.0 | 1.0 | 6 | Balance | 30 | | Nil | Nil |
| Comp. 3 | — | — | 6 | Balance | 30 | | Yes | Yes |

Ex.: Example
Comp.: Comparative

As is apparent from the results shown in Table 1, the brazing material for use in a low temperature brazing and the method for low temperature brazing according to the present invention, could well wet the base material by adding the rare-earth element and Ti, and realized good brazing free from leakage.

This application claims priority to Japanese Patent Application No. Hei 9(1997)-156488, the disclosure of which is incorporated by reference in its entity.

It should be noted that the terms and expressions used herein are illustrative only, are not intended to limit the scope of the invention and does not exclude any equivalent of features indicated and described herein and that various modifications and variations falling within the scope of claims of the invention are tolerated.

What is claimed is:

1. A method for low temperature brazing comprising:

brazing aluminum materials by applying a brazing material at a temperature of 425 to 440° C., wherein said brazing material comprises 0.001 to 3.0 wt % of rare-earth element and the balance Zn and impurities.

2. The method for low temperature brazing as recited in claim 1, wherein said brazing material further comprises 0.005 to 3.0 wt % of Ti.

3. A method for low temperature brazing comprising:

brazing aluminum materials by applying a brazing material at a temperature of 390 to 540° C., wherein said brazing material comprises 0.001 to 3.0 wt % of rare-earth element, 30 wt % or less of Al and the balance Zn and impurities.

4. The method for low temperature brazing as recited in claim 3, wherein said brazing material further comprises 0.005 to 3.0 wt % of Ti.

5. A method for low temperature brazing comprising:

brazing aluminum materials by applying a brazing material at a temperature of 520 to 580° C., wherein said brazing material comprises 0.001 to 3.0 wt % of rare-earth element, 20 to 50 wt % of Zn, 10 wt % or less of Si and the balance Al and impurities.

6. The method for low temperature brazing as recited in claim 5, wherein said brazing material further comprises 0.005 to 3.0 wt % of Ti.

\* \* \* \* \*